United States Patent [19]

Birkestrand

[11] 4,279,181

[45] Jul. 21, 1981

[54] TOOL CONTROL HEAD FOR PIPE AND TUBING CUTTING MACHINE

[76] Inventor: Orville J. Birkestrand, 129A Casuda Canyon Dr., Monterrey Park, Calif. 91754

[21] Appl. No.: 42,761

[22] Filed: May 29, 1979

[51] Int. Cl.³ .................. B23B 21/00; B23B 5/14
[52] U.S. Cl. .................. 82/21 A; 82/71; 82/92; 92/9; 30/97; 30/101
[58] Field of Search .......... 82/71, 92, 21 A; 30/94, 30/97, 101, 102; 92/9, 12; 408/11, 130

[56] References Cited

U.S. PATENT DOCUMENTS

| | | | |
|---|---|---|---|
| 1,765,208 | 6/1930 | Cunningham | 82/92 |
| 2,553,147 | 5/1951 | Roeschiese | 82/71 |
| 2,619,174 | 11/1952 | Neale | 82/71 |
| 2,706,917 | 4/1955 | Hill | 408/130 |
| 2,857,789 | 10/1958 | Robinson | 408/130 |
| 4,072,073 | 2/1978 | Birkestrand | 82/92 |

*Primary Examiner*—Leonidas Vlachos
*Attorney, Agent, or Firm*—William T. O'Neil

[57] ABSTRACT

A machine for performing cutting, roll-grooving and like operations on pipe or tubing. A pneumatically operated head assembly provides for rapid tool advancement to a first predetermined position short of work engagement and hydraulically cushioned advancement therefrom to work engagement. A captive oil supply flow freely through poppet valves which close at first predetermined tool position, and at a controllable rate through a needle valve between the first and second tool positions. Automatic poppet reset occurs for rapid tool withdrawal, readying the apparatus for recycling.

8 Claims, 4 Drawing Figures

TOOL CONTROL HEAD FOR PIPE AND TUBING CUTTING MACHINE

BACKGROUND OF THE INVENTION

In the prior art, cutting tool control devices are known. The known devices include those operated hydraulically, pneumatically and manually.

In manufacturing, convenience, repeatability and speed of operation translate into time and cost savings. Accordingly, there is an economic incentive to provide reliable tool feed control which is also fast in operation.

In pipe and tube machines of the type employing a cutting or crimping wheel which is advanced against the rotating pipe or tubing (nested in a pair of drive rollers), the optimum tool application is rapid from its rest position to a first predetermined point just short of the surface of the work and at a slower controllable rate thereafter corresponding to a desired cutting or forming rate thereafter. Upon reaching the desired depth of working or upon parting of the work in a cutting operation, it is desired to have the tool reset rapidly so that another working cycle can begin without delay.

Prior art devices for effecting the aforementioned operations have relied on mechanical stops, imprecise dash-pots or the like for controlling feed rate. Other prior art devices for the purpose were unduly complex and costly.

The manner in which the present invention addresses the prior art to produce an effective, efficient and relatively inexpensive structure will be evident as this description proceeds.

SUMMARY OF THE INVENTION

The invention concerns a pneumatically operated head having a piston assembly therein which is activated by air pressure. The piston assembly is held in its quiescent position by at least one compression spring and is forced downward by air pressure during operation. Second and third internal chambers contain a quantity of captive hydraulic fluid separate from the pneumatic chamber. These chambers are functionally interconnected through at least one poppet valve and a needle valve arrangement which is conventionally adjustable to permit fluid flow at a relatively low rate.

The aforementioned poppet valve or valves remain open (by gravity for example) and as the piston assembly is forced (downward normally) to advance the tool, the motion is relatively rapid as the hydraulic fluid flows from the diminishing second chamber volume around the poppets into the third chamber, the volume of which is increasing as the piston assembly advances the tool in response to the air pressure in the first (pneumatic) cylinder. As the poppets close in response to the rapid hydraulic pressure build-up in the second chamber, the first predetermined point is reached whereby the tool is ready to engage the work. Hydraulic flow fluid continues at a reduced rate controlled by the adjustment of a needle valve in communication with the second and third chambers. During this time, the tool is advancing against or through the work.

Upon release of the actuating air pressure, the springs return the piston assembly to its rest position. This action is relatively rapid, since the poppets now "fall" open because the second chamber hydraulic pressure falls abruptly and fluid flows in reverse from the third into the second chamber.

The parameters of the hydraulic circuit along with some first point presetting by adjustment of the mechanical linkage from the driving parts of the piston assembly provide for placement of the first predetermined point appropriately. Moreover, the entire head assembly is vertically adjustable, for example, by a rack and pinion arrangement shown in the drawings.

The details of a typical embodiment according to the invention will be understood from the description hereinafter.

BRIEF DESCRIPTION OF THE DRAWINGS

FIG. 2A is a section view taken on line 2A—2A of FIG. 2.

DETAILED DESCRIPTION

Figure 1:
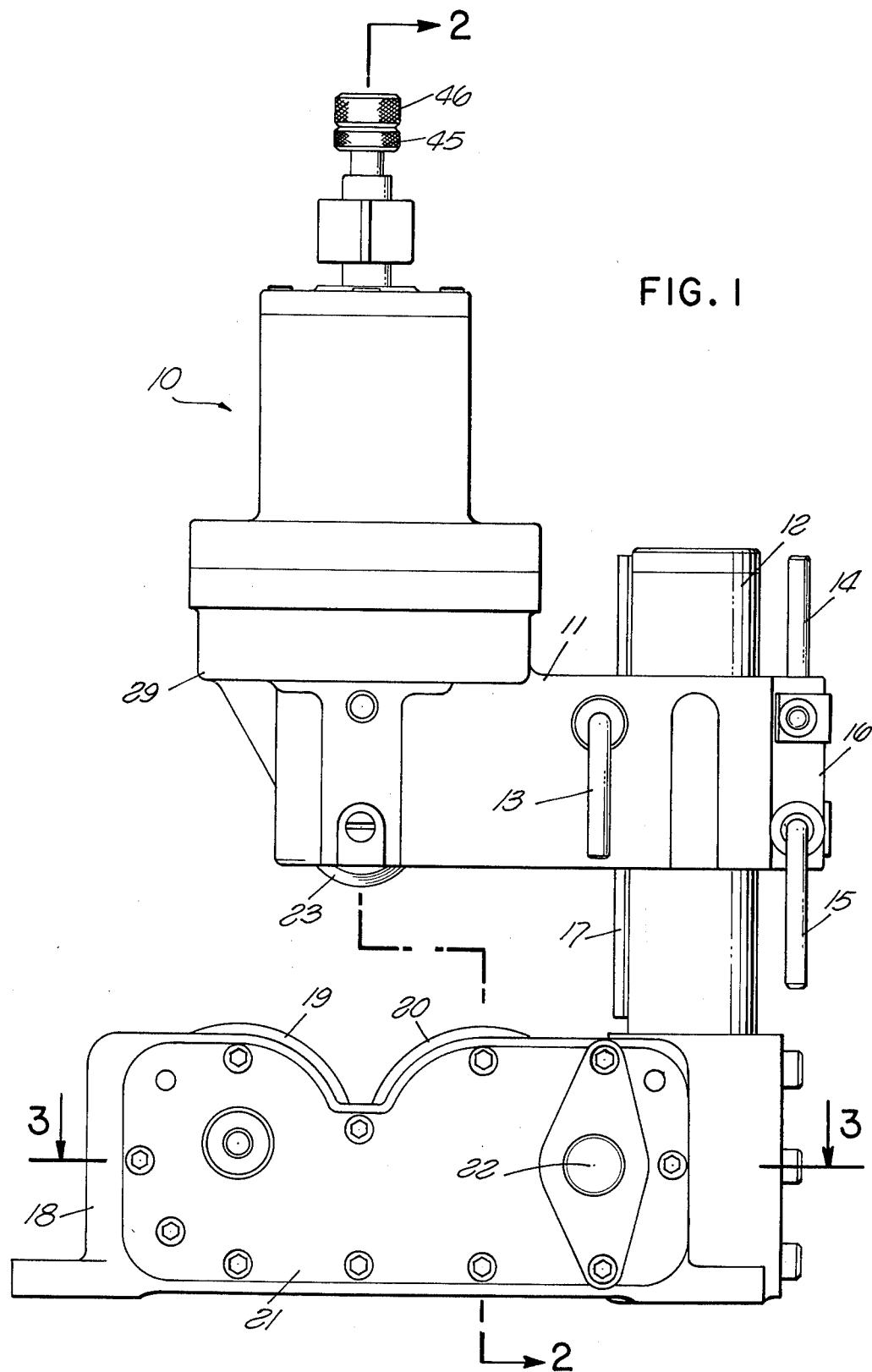
FIG. 1 is a pictorial representation of a control Head according to the invention mounted on a vertical column with height adjustment means and a base and drive roller assembly.

Referring now to FIG. 1, the assembled apparatus is shown as it would normally be in operation. The tool control head generally represented at 10 has its main frame extended out at 11. This support extension 11 has a vertical bore fitting over support column 12 and is split at 16 so that L-handle bolt members 14 and 15 can pinch the split at 16 to grip column 12 firmly at a selected vertical position. A pinion gear handle 13 operates a pinion gear internally to 11 against rack 17 which is attached to column 12. This vernier adjustment and the clamping feature are now conventional in this art and are shown in U.S. Pat. No. 4,072,073.

The base assembly with housing 18 and cover plate 21 and with rollers 19 and 20, at least one of which is driven to rotate the work as shaft 22 is powered externally, is firmly anchored to column 12. The cross-section of the pipe or tubing to be worked would appear in FIG. 1 rested on rollers 19 and 20 and in contact with cutter or roll working tool wheel 23. The downward advancement of 23 will be explained hereinafter.

Figure 2:
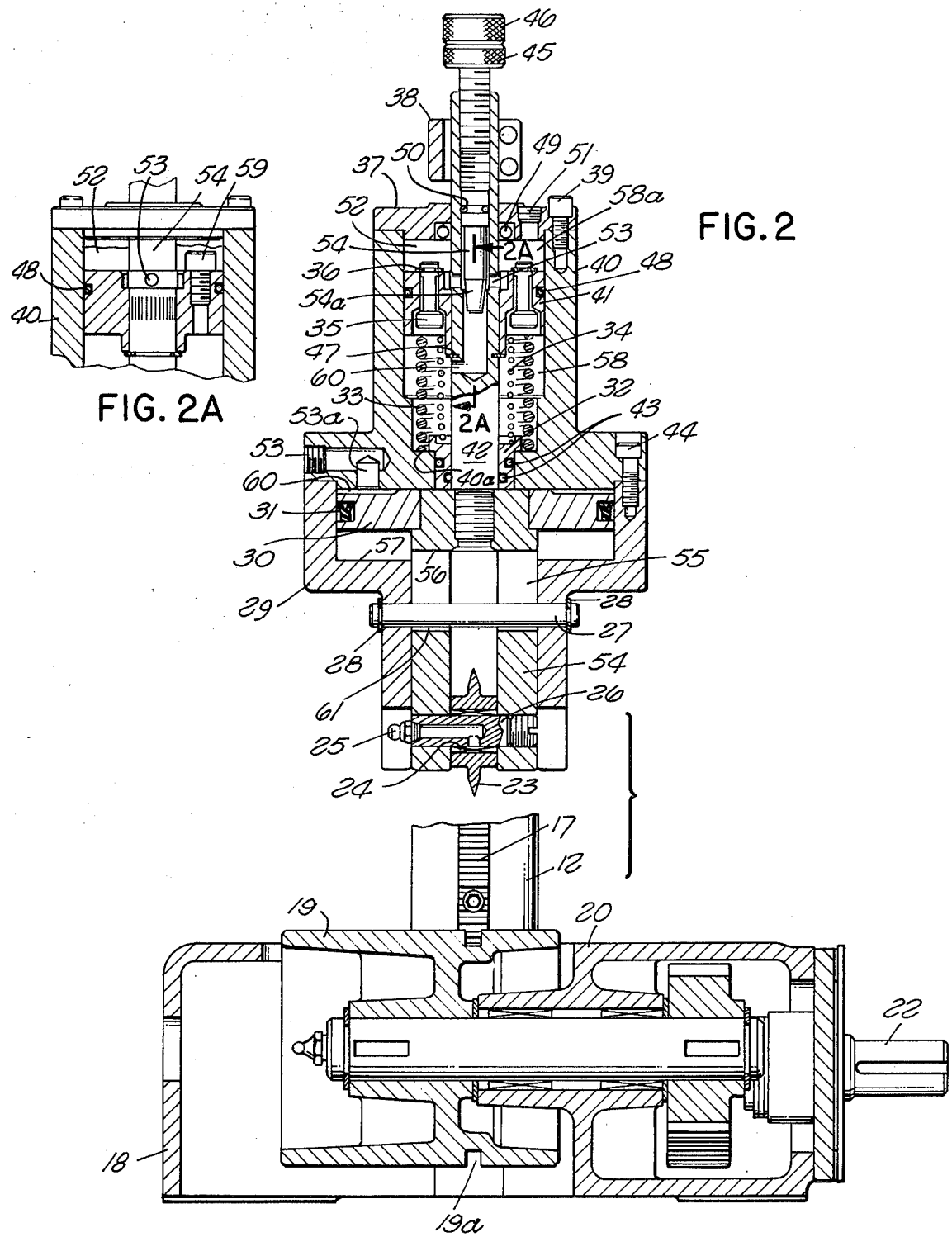
FIG. 2 is sectional view illustrating the internal parts of the head and base drive roller assemblies of FIG. 1.

Referring now to FIG. 2, the section taken as identified in FIG. 1 shows the functional and structural aspects of the head and roller drive. The head main frame (housing) 29 contains a piston assembly comprising a tubular shaft 54 connected to a control rod 42 with a partial axial bore from the top end and a hydraulic piston member 41 attached thereto. The control rod extends past seal 49, which seals it with respect to cap 37, to a bracket assembly 38 which permits needle valve shaft 54 to slide up and down in operation. Projecting from the control rod top and threaded within its partial axial bore is a needle valve member 54 having a chamfered end 54a operative to control fluid flow through opening(s) 53 in the control rod wall as the needle valve control knob 46 is turned. Lock nut 45 serves to prevent rotation of 54 during operation.

Through the piston 41 (vertically) are at least one bore containing a poppet valve 35 which fits loosely and hangs open (downward) by gravity in the quiescent condition. Hydraulic fluid fills chamber 58 (second chamber) and extends to an arbitrary level 52 in the third chamber.

Air piston 30 is press fitted to the upper end of 54 and air under pressure introduced at 53 through 53a into chamber 60 forces piston 30 downward. Springs 33 and 34, which tend to hold the piston assembly upward in the absence of actuating air at 53 are in compression between the internal shoulder and the bottom of piston member 41 for that purpose. The driving downward of piston 30 and hence the entire piston assembly further compresses springs 33 and 34 and forces hydraulic fluid past open poppet 35 into the third chamber, permitting rapid movement of the piston assembly downward to the first predetermined point at which time the poppet(s) 35 are forced closed. From this point on, the piston assembly and therefore the tool wheel 23 are advanced at the selected rate for working of the pipe or tubing material. Hydraulic fluid now flows more slowly through the needle valve lateral orifice 53 into the third chamber. It will be realized that the axial setting of the needle valve controls this rate (by rotation of knob 46), the side wall bore 60 in 47 being a part of the fluid path at that time.

It will be noted that the tubular shaft 54 has a slot 55 through which a rod 27 is fitted. Rod 27 is held in place typically by snap rings 28 and serves to keep the cutter wheel 23 aligned with the rollers' (19 and 20) axes during the cutting stroke.

A conventional grease zerk 25 lubricates the tool wheel bearing 24 against shaft 26 and the hydraulic fluid serves as the lubricant for the various sliding surfaces of the piston assembly. Seals 49 and 43 are fixed types, however 48 and 50 are sliding hydraulic seals.

Bolts 39 and 44 are conventional in all respects for obvious assembly purposes.

Upon release of the activating air supply at 53, the entire piston assembly is rapidly reset (upward) by springs 33 and 34, the poppet(s) 35 "falling" open because of the release of the upward piston force. As the piston assembly resets, cavity 58 regains the fluid previously transferred upward into the third cavity 58a. Snap rings 36 limit the fall of the poppet(s) and surface 57 limits the air piston 30 in its travel. Split lock clamp 38 may be preset to limit the overall stroke of the air piston 30; when set up with feeler gages it can be used as a precision depth stop. Moreover, its integral wrench flats allow it to be used to disassemble the shaft 50 from shank 54.

The gear rack 17 is visible in FIG. 2 as is column 12. The circumferential roller groove 19a accommodates the tool wheel 23 as it is advanced through the pipe or tubing. It will be understood that groove 19a and the shape of tool wheel 23 could be such as required to produce roll grooving in lieu of cutting.

In FIG. 2A, a lateral section through the piston assembly and housing 40 is taken to show additional detail, especially the fixed bleed adjustment 59. This adjustment provides a fixed amount of by-pass of hydraulic fluid around the needle valve so that, complete closure of the needle valve notwithstanding, the piston assembly will advance at some minimum rate.

Figure 3:
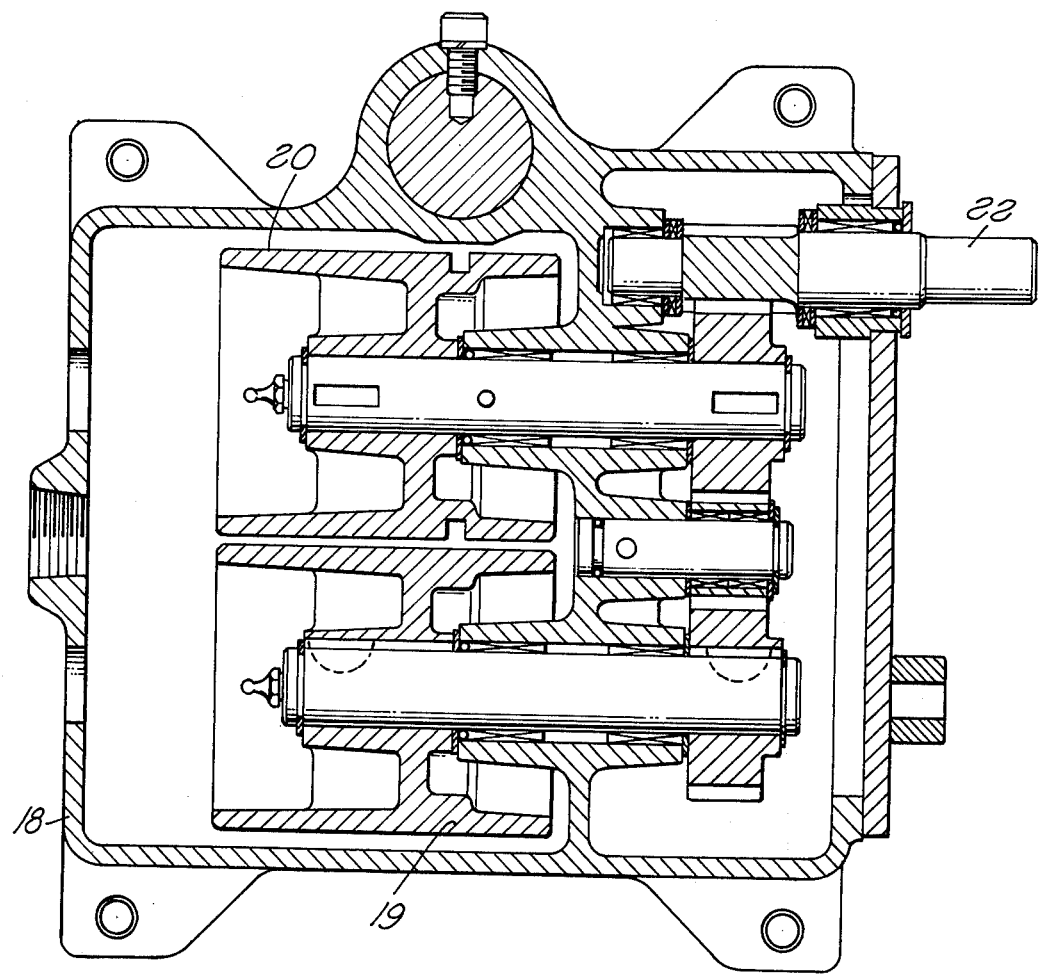
FIG. 3 is a top sectioned view through the roller axis of FIG. 1.

In FIG. 3 and the lower portions of FIG. 2, the drive roller assembly is shown for a complete understanding of the application of the control head of the invention, although it is to be understood that this roller drive arrangement is now conventional and may be as shown and described in U.S. Pat. No. 4,072,073. The reader desiring more information is referred to that patent.

Seal 31 is of the "U" type, suitable for air piston use, and is conventional of itself.

Materials used in fabrication of the apparatus are those well-known to those of skill in this art.

Variations within the purview of the invention will suggest themselves to those of skill in this art and accordingly, it is not intended that the drawings or this description should be regarded as limiting the scope of invention. The drawings are intended to be typical and illustrative only.

What is claimed is:

1. A machine tool device for advancing a tool against a work specimen, comprising:
   first means including a first piston within a housing and an output shaft connected to move with said first piston, said first piston being advanced in response to application of air under pressure to a first surface of said first piston;
   a free turning tool on said output shaft;
   a closed hydraulic circuit within said housing including a second piston and first and second chambers, one on each side of said second piston, said second piston being operatively connected to said first piston such that the volume of said first chamber decreases as said first piston is advanced;
   second means comprising at least one check valve and a corresponding associated first passage for controlled transfer of hydraulic fluid between said first and second chambers, said check valve having an inertial characteristic such as to close said first passage in response to hydraulic pressure against said check valve as said first chamber volume decreases, said closure being at a time corresponding to a first predetermined point of said tool advancement as permitted by said check valve inertial characteristic;
   third means comprising a by-pass passage and variable flow valve between said first and second chambers, said by-pass permitting hydraulic flow between said first and second chambers at a reduced rate compared to the flow through said check valve prior to its closure, said reduced flow rate permitting continued advancement of said tool from said first predetermined point to a second predetermined point at a reduced velocity; and
   resilient fourth means for restoring said first piston and therefore said tool to a withdrawal point when said air pressure is released, said check valve contemporaneously opening to permit relatively rapid back flow of said hydraulic fluid from said second to said first chamber.

2. Apparatus according to claim 1 in which said check valve is a poppet valve arranged to remain open by gravity in the absence of a hydraulic pressure in said first chamber substantially higher than in said second chamber.

3. Apparatus according to claim 2 in which said check valve is a plurality of poppet valves in corresponding passages between said first and second chambers to provide an effective flow therebetween which is a relatively large fraction of the rate of change of volume in said first chamber as said piston advances, thereby to afford relatively rapid advancement of said tool to said first predetermined point.

4. Apparatus according to claim 3 in which said fourth means comprises at least one compression spring arranged within said housing to mechanically bias said piston into said withdrawal point, said spring providing a force which is small compared to the force of said air pressure on said piston.

5. Apparatus according to claim 1 in which said fourth means comprises at least one compression spring arranged within said housing to mechanically bias said piston into said withdrawal point, said spring providing a force which is small compared to the force of said air pressure on said piston.

6. Apparatus according to claim 1 in which said variable flow valve comprises a needle valve within said by-pass passage.

7. Apparatus according to claim 6 in which mechanical relationships are constituted such that said first predetermined point is substantially the point of tool engagement with said work specimen and said second predetermined point constitutes substantially the extremity of tool advancement into said work.

8. Apparatus according to claim 1 in which said work is pipe or tubing, said free turning tool is a tool wheel of a type used for such pipe shaping operations as cutting and crimping, in which said pipe is rotated by underlying rollers, at least one of which is driven, said tool advancing device being disposed above said pipe or tubing, and in which said output shaft is axially slotted to form a bifurcated shape at its free end, and in which a tool wheel support shaft extends between the tines of said bifurcated end, rotatably supporting said tool wheel between said tines.

* * * * *